United States Patent Office 3,666,427
Patented May 30, 1972

3,666,427
PROCESS FOR THE PRODUCTION OF CYANOGEN CHLORIDE TOGETHER WITH CYANURIC CHLORIDE AND TETRAMERIC CYANOGEN CHLORIDE
Edgar Enders, Cologne, Flittard, Germany, assignor to Farbenfabriken Bayer Aktiengesellschaft, Leverkusen, Germany
No Drawing. Filed Mar. 3, 1969, Ser. No. 803,988
Int. Cl. C01b 31/00; C01c 3/00; C07c 119/00
U.S. Cl. 23—359                                    11 Claims

ABSTRACT OF THE DISCLOSURE

Process for producing cyanogen chloride by reacting in the liquid phase chlorine and hydrocyanic acid.

---

It is known that chlorine and hydrocyanic acid can be reacted in solvents (chloroform, ethanol) to form cyanuric chloride (Houben-Weyl "Methoden der Organischen Chemie," vol. III, p. 229). The reaction involves the use of large excess of chlorine, proceeds slowly and has the disadvantage that the solvent has to be worked up and recovered.

It is also known that chlorine and hydrocyanic acid can be reacted in the gas phase at 40° C. to form cyanogen chloride. In this case, the conversion amounts only to about 12%, for example for a reaction time of 5 minutes, and it is only at temperature around 360° C. that a complete reaction is obtained A process for the production of cyanogen chloride in addition to cyanuric chloride and tetrameric cyanogen chloride has now been found in which at least equimolar quantities of chlorine are reacted with hydrogen cyanide in the liquid phase at elevated pressure and at temperatures in a range of from about −20° C. to about +50° C., preferably in the presence of a catalyst and optionally in the presence of an inert gas.

Compared with the processes referred to above, it must be regarded as extremely surprising that chlorine and hydrocyanic acid can be smoothly reacted together under pressure in the liquid phase to form cyanogen chloride at temperatures around 0° C. The use of diluents which complicate subsequent working up is avoided.

The process according to the invention is usually carried out in suitable pressure vessels in the liquid phase at temperatures of from about −20° C. to about +50° C. (preferably from −10° C. to about +30° C.) in the absence of a catalyst or preferably in the presence of a chlorination catalyst. The catalyst is used in a quantity of from 0.1 to 2.0 mol percent and preferably in a quantity of from 0.1 to 1 mol percent. In cases where the process is carried out in batches, the catalyst is with advantage initially placed in the pressure vessel, and a mixture of equimolar quantities of chlorine and hydrogen cyanide is introduced into it. Where the process is carried out continuously, the catalyst may be added either to the liquid chlorine or to the hydrogen cyanide. The reaction is with advantage carried out in such a way that an excess of from 0.5 to 5 mol percent, and preferably from 0.5 to 2 mol percent, of chlorine is maintained in the reaction vessel. In the absence of a catalyst, the reaction proceeds much more slowly so that it is better to operate at the upper end of the temperature/pressure range specified above.

Where chlorine and hydrogen cyanide are reacted together under the conditions described, cyanogen chloride and hydrogen chloride are formed in a smooth reaction. The process according to the invention is usually carried out at the excess pressure which prevails at temperatures in the range selected, for example, from 4 to 6 atms. at a reaction temperature of from −10° C. to about 0° C., or from 15 to 20 atms. at a reaction temperature of 30° C.

It is also possible, however, to increase the pressure prevailing in the reaction vessel, for example, to 50 atms. by pumping in an inert gas, for example nitrogen, in order to reduce the concentration of chlorine in the gaseous zone and hence to obtain a more complete reaction. Through the catalytic activity of the hydrogen chloride present in a high concentration under excess pressure, cyanogen chloride is trimerised in a slow reaction to give cyanuric chloride. Tetrameric cyanogen chloride (2,4-dichloro - 6 - dichloromethylene - amino - 1,3,5 - triazine) is formed as a secondary product.

However, if it is desired solely to produce cyanogen chloride, the process according to the invention is preferably carried out in a continuous cycle. It is possible in this way to obtain a stream of cyanogen chloride which contains only a little cyanuric chloride and may obtionally be converted into cyanuric chloride containing a little tetrameric cyanogen chloride by known processes, for example over active carbon catalysts at temperatures of from 300° C. to about 350° C. or under pressure at temperatures of from 350° C. to about 400° C.

As a rule, inorganic halogen compounds, for example Friedel-krafts catalysts, are used as the catalysts. Examples of inorganic halogen compounds include iron (III)-chloride, aluminium (III)-chloride, antimony (III)-chloride, boron trifluoride etherate, zinc (II)-chloride and copper (I)-bromide. Active carbon and acid aluminium silicates are also suitable for use as catalysts.

However, it is preferred to use catalysts of the kind that are readily volatile and do not form any residue. Phosphorus trichloride and phosphorus pentachloride are particularly preferred. It is also possible to use sulphur compounds such as sulphur dichloride and disulphur dichloride, as well as organic radical formers such as azodiisobutyronitrile or dibenzoyl peroxide as catalysts.

EXAMPLE 1

2 parts by weight of phosphorus trichloride are introduced into a glass pressure vessel with a capacity of about 500 parts by volume and equipped with a double jacket, a stirring mechanism, a thermometer, a manometer and two inlet pipes. 5 parts by weight of liquid chlorine are then pumped in, followed by cooling to −10° C. A total of 142 parts by weight of liquid chlorine and 52 parts by weight of liquid hydrocyanic acid (water content: approximately 0.5%) are then pumped in over a period of 40 minutes during which an excess of from 2 to 5 parts by weight of chlorine is maintained. The reaction is exothermic and the temperature is kept at from −10° C. to 0° C. The internal pressure settles at 4 to 6 atms. Towards the end of pumping, colourless cyanuric chloride begins to crystallise out of the yellowish, liquid contents of the reactor. The temperature is allowed to rise slowly to 20° C. as a result of which the reaction mixture completely solidifies. A mixture of 85% of cyanuric chloride and 15% of tetrameric cyanogen chloride is obtained by distillation in a yield of 90% of the theoretical (based on hydrogen cyanide). The reaction takes longer in the absence of phosphorus trichloride in which case it is preferred to operate at +10° C. and under a pressure of from 10 to 15 atms.

EXAMPLE 2

100 parts by weight of cyanogen chloride and 1 part by weight of phosphorus trichloride are introduced into a vertical, cylindrical glass pressure vessel with a capacity of about 250 parts by volume which is equipped with a double jacket, a stirring mechanism, a thermometer, a manometer, two inlet pipes, a pressure relief valve at its upper end and a discharge valve at its lower end, and is cooled to −3° C. 560 parts by weight per hour of liquid chlorine in admixture with 10 parts by weight per hour of phosphorus trichloride and 208 parts by weight per hour of anhydrous liquid hydrocyanic acid are then uniformly pumped in so that there is always a slight excess of chlorine. The temperature is kept between −3° C. and about +3° C. by cooling. The liquid phase is removed through the discharge valve in such a way that the liquid level remains the same. The internal pressure is kept at 6 to 8 atms. by letting off the hydrogen chloride.

A stream of cyanogen chloride with small amounts of cyanuric chloride is obtained in a yield of approximately 90% of the theoretical. Further amounts may be obtained by intensively cooling the stream of cyanogen chloride.

I claim:

1. Process for preparing cyanogen chloride together with cyanuric chloride and tetrameric cyanogen chloride which comprises reacting in the absence of a diluent liquid chlorine and liquid hydrogen cyanide in equimolar quantities up to an excess of from 0.5 to 5 mol percent of liquid chlorine, at a temperature in the range of from about −20° C. to about +50° C., under elevated pressure sufficient to maintain the chlorine and the hydrogen cyanide in the liquid phase.

2. Process of claim 1 wherein the temperature is in the range of from −10° C. to about +30° C.

3. Process of claim 1 wherein the pressure is from 4 to 20 atmospheres.

4. Process of claim 1 wherein the reaction is carried out in the presence of an inert gas.

5. Process of claim 4 wherein elevated pressures of up to 50 atmospheres are employed.

6. Process of claim 1 wherein the reaction is carried out in the presence of a chloronation catalyst selected from the group of iron (III)-chloride, boron trifluoride etherate, zinc (II)-chloride, copper (I)-bromide, active carbon, acid aluminum silicates, sulphur dichloride, disulphur dichloride, azodiisobutyronitrile and dibenzoyl peroxide.

7. Process of claim 6 wherein said catalyst is used in a quantity of from 0.1 to 2.0 mol percent.

8. Process of claim 6 wherein said catalyst is a phosphorous chloride.

9. Process of claim 1 wherein the water content of the reactants is approximately 0.5 percent.

10. Process of claim 1 wherein anhydrous hydrogen cyanide is employed.

11. Process of claim 1 carried out continuously.

References Cited

UNITED STATES PATENTS 2,608,591  8/1952  Lawlor _____ 260—650 R

FOREIGN PATENTS 347,989  5/1931  Great Britain _____ 23—359
974,229  11/1964  Great Britain _____ 23—359

OTHER REFERENCES

Groggins: "Unit Processes In Organic Synthesis," 5th edition, 1958, p. 265.

MILTON WEISSMAN, Primary Examiner

U.S. Cl. X.R.

260—248